US008792900B2

(12) United States Patent
Chen et al.

(10) Patent No.: US 8,792,900 B2
(45) Date of Patent: Jul. 29, 2014

(54) AUTONOMOUS UNLICENSED BAND REUSE IN MIXED CELLULAR AND DEVICE-TO-DEVICE NETWORK

(75) Inventors: Tao Chen, Salo (FI); Qianxi Lu, Beijing (CN)

(73) Assignee: Nokia Corporation, Espoo (FI)

( * ) Notice: Subject to any disclaimer, the term of this patent is extended or adjusted under 35 U.S.C. 154(b) by 965 days.

(21) Appl. No.: 12/888,774

(22) Filed: Sep. 23, 2010

(65) Prior Publication Data

US 2012/0077510 A1    Mar. 29, 2012

(51) Int. Cl.
*H04W 72/00* (2009.01)

(52) U.S. Cl.
USPC ...................................... 455/452.1

(58) Field of Classification Search
USPC ........ 455/452.1, 447, 426.1, 450, 452.2, 453, 455/516–519, 418–420; 370/329, 338
See application file for complete search history.

(56) References Cited

U.S. PATENT DOCUMENTS

| | | | |
|---|---|---|---|
| 6,850,489 B1 * | 2/2005 | Omi et al. ...................... | 370/230 |
| 8,509,788 B2 * | 8/2013 | Natarajan et al. ............. | 455/448 |
| 2006/0246903 A1 | 11/2006 | Kong et al. | |
| 2007/0281704 A1 | 12/2007 | Lin et al. | |
| 2008/0002658 A1 | 1/2008 | Soliman | |
| 2008/0113624 A1 | 5/2008 | Seidel et al. | |
| 2009/0054058 A1 * | 2/2009 | Andreasson et al. ....... | 455/426.1 |
| 2011/0289175 A1 * | 11/2011 | Lee et al. ..................... | 709/208 |

FOREIGN PATENT DOCUMENTS

| | | |
|---|---|---|
| WO | 2009048820 A1 | 4/2009 |
| WO | 2009/125056 A1 | 10/2009 |
| WO | 2011/063295 A1 | 5/2011 |

OTHER PUBLICATIONS

Klaus Doppler et al., "Device-to-Device Communication as an Underlay to LTE-Advanced Networks", Topics in Radio Communications, IEEE Communications Magazine, Dec. 2009, pp. 42-49.
International Search Report international application No. PCT/IB2011/054154 dated Feb. 15, 2012.

* cited by examiner

*Primary Examiner* — Brandon Miller
(74) *Attorney, Agent, or Firm* — Squire Patton Boggs (US) LLP

(57) ABSTRACT

Methods, apparatuses, a system and computer program products are provided for autonomously reusing an unlicensed band in a hybrid cellular and device-to-device network. In accordance with an embodiment of the invention, an apparatus receives a request for resources from a terminal, and identifies available resources on an unlicensed band based on the request. The apparatus further reserves the identified available resources for use by the terminal, and transmits a reservation response to the terminal, wherein the reservation response comprises information relating to the reserved available resources. Further, the apparatus transmits data to the terminal over a licensed band and the available resources reserved on the unlicensed band.

20 Claims, 10 Drawing Sheets

AUTONOMOUS UNLICENSED BAND REUSE IN MIXED CELLULAR AND DEVICE-TO-DEVICE NETWORK

BACKGROUND

1. Field

Embodiments of the invention generally relate to communications networks and particularly to wireless communications networks, for example, Global System for Mobile Communications (GSM), the Universal Mobile Telecommunications System (UMTS) Terrestrial Radio Access Network (UTRAN), Long Term Evolution (LTE), LTE Advanced (LTE-A) and the Evolved Universal Terrestrial Radio Access Network (e-UTRAN). More specifically, certain embodiments of the invention are directed to methods, apparatuses, a system and computer program products for autonomously reusing an unlicensed band in a hybrid cellular and device-to-device network.

2. Description of the Related Art

Wireless communication networks are traditionally categorized into cellular networks and ad-hoc networks. In a cellular network, a mobile node, for example user equipment (UE), indirectly communicates with another mobile node through a network node, for example a base station. Whereas, in an ad-hoc network, the mobile node communicates directly with the other mobile node through direct traffic or relay.

Communication traffic in a cellular network may be directed through a centralized controller, for example an evolved NodeB (eNB), even when the source and destination of the communication traffic are close to one another. An important benefit of a cellular network is the ease at which resources and interference can be controlled. However, cellular networks are known to experience inefficient resource utilization. For example, communication over a cellular network may require twice the amount of resources than would be required for a direction transmission over an ad-hoc network (i.e., when the two mobile nodes or users are in close proximity to one another).

Hybrid communication networks have been developed to improve wireless communications. These hybrid communication networks include both a cellular mode and a direct device to device (D2D) mode to enhance system performance. As illustrated in FIG. 1, a mobile node can choose either the cellular mode or the D2D mode to communicate with another mobile node. However, current hybrid communication networks still experience problems associated with resource sharing and communication interference.

SUMMARY

In accordance with an embodiment of the invention, there is provided a method which includes receiving, at a first terminal, a request for resources from a second terminal, and identifying, at the first terminal, available resources on an unlicensed band based on the request. The method further includes reserving, at the first terminal, the identified available resources for use by the second terminal, and transmitting, at the first terminal, a reservation response to the second terminal. The reservation response includes information relating to the reserved available resources. Further, the method includes transmitting, at the first terminal, data to the second terminal over a licensed band and the available resources reserved on the unlicensed band.

In accordance with an embodiment of the invention, there is provided an apparatus which includes at least one processor, and at least one memory including computer program code. The at least one memory and the computer program code are configured to, with the at least one processor, cause the apparatus at least to receive a request for resources from a terminal, and identify available resources on an unlicensed band based on the request. The at least one memory and the computer program code are further configured to, with the at least one processor, cause the apparatus at least to reserve the identified available resources for use by the terminal, and transmit a reservation response to the terminal. The reservation response includes information relating to the reserved available resources. Further, the at least one memory and the computer program code are configured to, with the at least one processor, cause the apparatus at least to transmit data to the terminal over a licensed band and the available resources reserved on the unlicensed band.

In accordance with an embodiment of the invention, there is provided a method which includes transmitting, at a first terminal, a request for resources to a second terminal, and receiving information from the second terminal. The information includes a reservation result relating to available resources reserved on an unlicensed band for data transmission between the first and the second terminals, based on the transmitted request. The method further includes receiving data from the second terminal over a licensed band and the available resources reserved on the unlicensed band.

In accordance with an embodiment of the invention, there is provided an apparatus which includes at least one processor, and at least one memory including computer program code. The at least one memory and the computer program code are configured to, with the at least one processor, cause the apparatus at least to transmit a request for resources to a terminal, and receive information from the terminal. The information includes a reservation result relating to available resources on an unlicensed band for data transmission from the terminal, based on the transmitted request. The at least one memory and the computer program code are further configured to, with the at least one processor, cause the apparatus at least to receive data from the terminal over a licensed band and the available resources reserved on the unlicensed band.

BRIEF DESCRIPTION OF THE DRAWINGS

Reference will now be made in detail to the embodiments of the invention, examples of which are illustrated in the accompanying drawings

DETAILED DESCRIPTION

Figure 1:
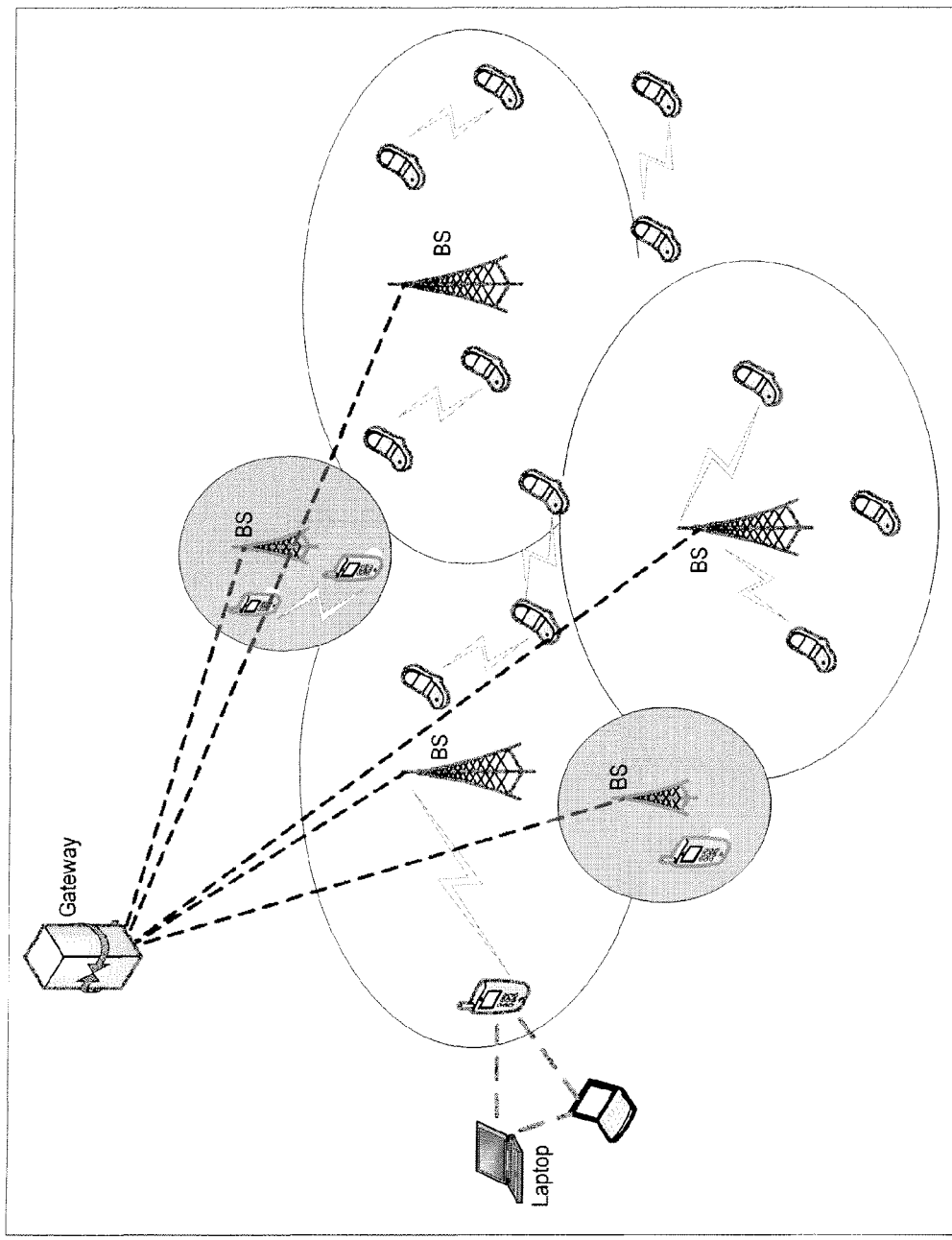
FIG. 1 illustrates a structure of a conventional hybrid wireless communication network.

It will be readily understood that the components of the invention, as generally described and illustrated in the figures herein, may be arranged and designed in a wide variety of different configurations. Thus, the following detailed description of the embodiments of the methods, systems, apparatuses, and computer program products, as represented in the attached figures, is not intended to limit the scope of the invention as claimed, but is merely representative of selected embodiments of the invention.

For example, while the exemplary embodiments have been described above in the context of LTE and LTE-A systems, it should be appreciated that the exemplary embodiments of this invention are not limited for use with this one particular combination of wireless communication systems, and that they may be used in other wireless communication systems and combinations of wireless communication systems.

Furthermore, while certain embodiments of the invention, as discussed below, will refer to the capability of data transmission on multiple carrier/bands, these embodiments also are applicable to a single carrier/band transmission of data (i.e., only one of the licensed and unlicensed bands is employed by the wireless devices for data transmission).

Certain embodiments of the invention integrate D2D communications into a cellular network, for example a LTE/LTE-A cellular network, as specified by various releases of the 3rd Generation Partnership Project (3GPP) standard in the area of mobile network technology. In particular, certain embodiments permit wireless communications from one mobile node to another, whereby a cellular licensed band spectrum is reused by D2D users.

In a conventional hybrid communication network, a licensed spectrum is a radio spectrum designated by the Federal Communications Commission (FCC) that is reserved for organizations that have been granted licenses to this radio spectrum. In other words, a licensed spectrum functions as a dedicated communication band. The licensed spectrum is a single frequency carrier that provides strong signal levels, potentially 10 to 100 times more powerful than an unlicensed spectrum, and an excellent signal-to-noise ratio. With exclusive rights, a license holder operates with little interference or spectrum crowding. The licensed spectrum, however, is a communication resource that may be insufficient on its own to support a large number of mobile devices in the network.

Further, in the conventional hybrid communication network, an unlicensed spectrum has been identified for wireless communications that permit wireless devices (i.e., for WLAN devices and access points) to operate in a band set aside by the FCC for industrial, scientific or medical (ISM) applications. While free to obtain access to the unlicensed spectrum, wireless devices must adhere to FCC rules for the ISM band, most notably requiring that devices transmit 1 watt or less of power, not cause harmful interference and accept any interference received without causing undesired operation. Individual countries' use of the unlicensed band may differ due to variations in national radio regulations. For example, the 2 GHz and the 5 GHz unlicensed bands are more popular, because they are used for wireless devices associated with the IEEE 802.11 WLAN series technology. Table 1 identifies the frequency range and center frequency for the ISM band, as designated by the International Telecommunication Union Radiocommunication Sector (ITU-R).

TABLE 1

ISM Band Frequency Range and Center Frequency

| Frequency range | Center frequency |
|---|---|
| 6.765-6.795 MHz | 6.780 MHz |
| 13.553-13.567 MHz | 13.560 MHz |
| 26.957-27.283 MHz | 27.120 MHz |
| 40.66-40.70 MHz | 40.68 MHz |
| 433.05-434.79 MHz | 433.92 MHz |
| 902-928 MHz | 915 MHz |
| 2.400-2.500 GHz | 2.450 GHz |
| 5.725-5.875 GHz | 5.800 GHz |
| 24-24.25 GHz | 24.125 GHz |
| 61-61.5 GHz | 61.25 GHz |
| 122-123 GHz | 122.5 GHz |
| 244-246 GHz | 245 GHz |

Figure 2:
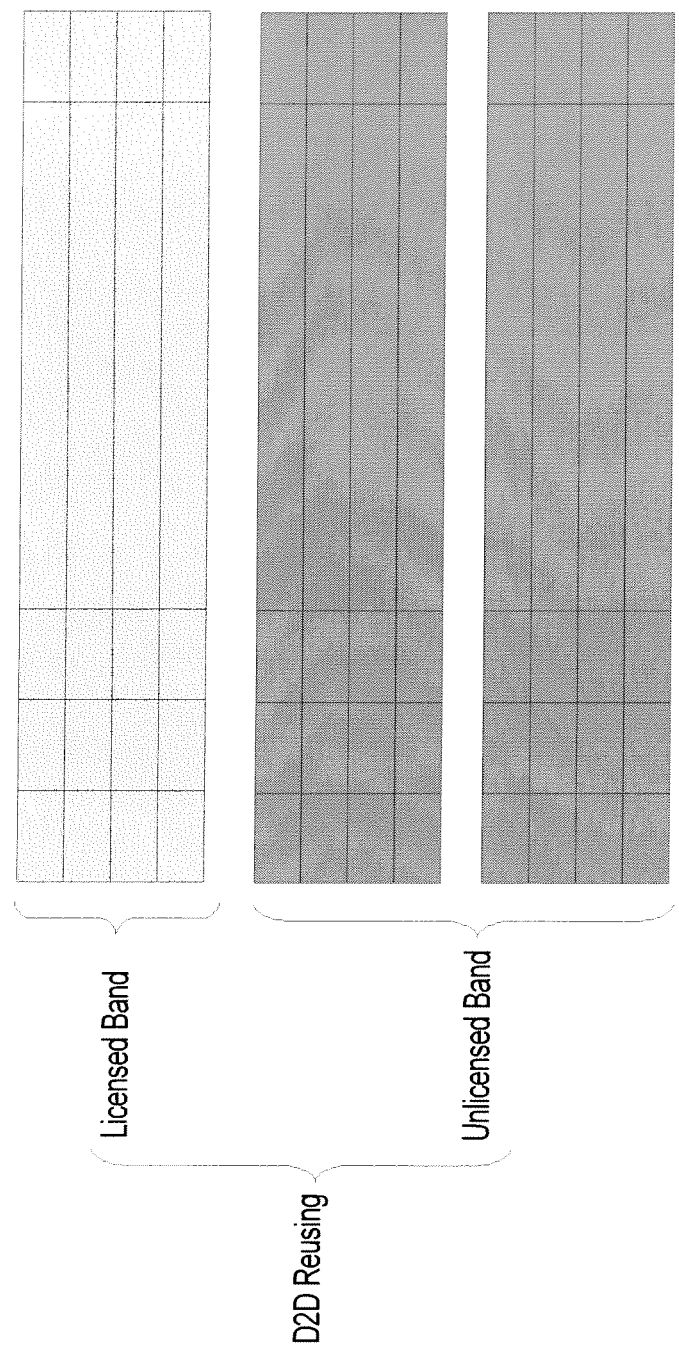
FIG. 2 illustrates an example of D2D reuse of licensed and unlicensed bands according to a conventional hybrid wireless communication network.

Conventional hybrid communication networks have mitigated the traffic load experienced in the licensed band by employing available resources in the unlicensed band for local D2D communication, as shown in FIG. 2. For example, the carrier aggregation feature defined in LTE-A protocols can be employed to implement the use of available resources in the unlicensed band for local D2D communication. However, conventional hybrid communication networks have yet to avoid the high levels of interference experienced with other operating systems (i.e., a 802.11 WLAN system) in the ISM band.

While conventional hybrid communication networks have employed both the licensed and unlicensed band, they operate from an inter-networking perspective, whereby the IP flow requires the system to choose between access to the cellular network or the WLAN network to acquire better performance, but not both at the same time. Hence, conventional hybrid communication networks can only operate on one of the two modes at a time.

Thus, for D2D communication reuse of the unlicensed band, there is a reliance on the inter-networking between the cellular network and the WLAN network entities, for example mobility management entity/D2D Registration Server Function (MME/DRSF) and WLAN access points (WLAN APs).

There are several disadvantages of this inter-networking perspective. For example, the implementation of an inter-networking scheme is based on the desire of the network operators, which can limit the feasibility of inter-networking based proposals. Furthermore, relying on a statistic report from an access point, the mechanism can only capture static white space in the unlicensed spectrum. However, based on a contention-based Distribution Coordination Function (DCF) mechanism, the available unlicensed resources are highly time varying, and therefore it is difficult to reuse these resources using the inter-networking scheme because of signaling delay in the core network and limited information at the access point.

Another disadvantage to the inter-networking scheme is that a network-controlled D2D resource schedule during a WLAN Point Coordination Function (PCF) period may cause a large signaling overhead, particularly when the number of active devices is large and the interference relationship between the active devices is complicated.

Thus, certain embodiments of the invention provide a hybrid communication network that enables D2D devices to autonomously reuse available resources in an unlicensed band, which does not rely on inter-networking signaling exchange (i.e., the network can be implemented by a licensed system infrastructure only and can accomplish D2D resource management and competition in a distributed manner).

According to an embodiment of the invention, two different communication modes can co-exist in the cellular spectrum (i.e., both the cellular and the D2D communication modes can co-exist). The cellular mode can include, for example a LTE or LTE-A system. According to an embodiment of the invention, D2D devices are capable of integrating resources in multiple bands (i.e., integrating resources in both the licensed and unlicensed band) for data transmission between mobile nodes.

In accordance with an embodiment of the invention, an apparatus is configured to provide an unlicensed band reuse function (UBRF) to enable D2D data transmission between multiple remote access terminals by acquiring available resources of an unlicensed band. The apparatus may include a remote access terminal (e.g., a mobile node). The acquisition of available resources of the unlicensed band is based on defined Media Access Control/Physical Layer (MAC/PHY) protocol stacks of existing systems operating in the unlicensed band. According to this embodiment, a control plane of the network uses a WLAN 802.11 mechanism, while the user plane of the network operates over a LTE or LTE-A for D2D data transmission on the unlicensed band.

Figure 3:
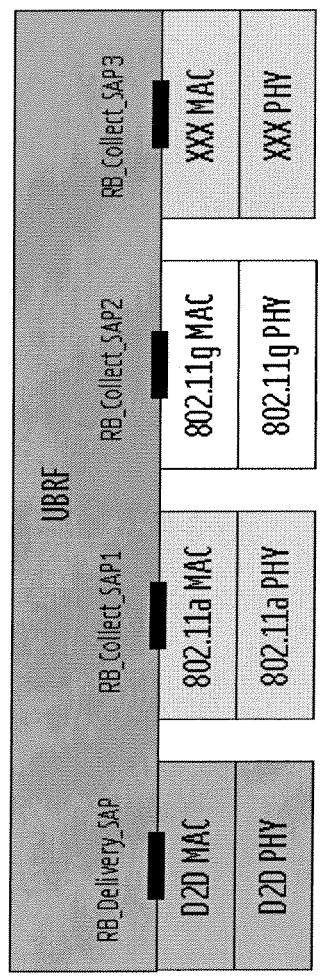
FIG. 3 illustrates a functional structure of an unlicensed band reuse function of an apparatus, in accordance with an embodiment of the invention.

For example, as shown in FIG. 3, the UBRF enables the network node to efficiently coordinate data transmission between multiple remote access terminals using a D2D MAC/PHY layer and a non-D2D MAC/PHY layer (i.e., a license-exempt device protocol, for example a WLAN).

Figure 4:
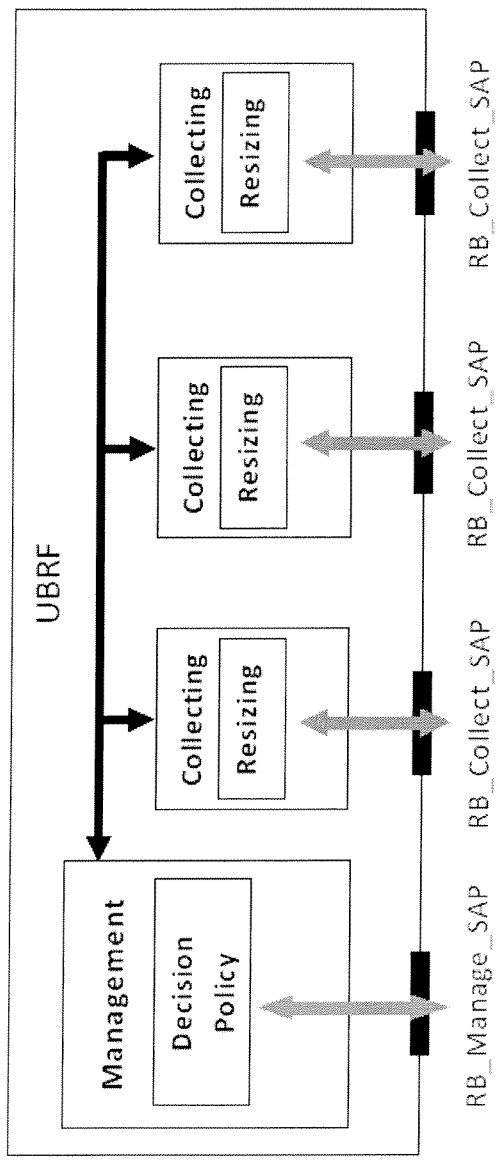
FIG. 4 illustrates a module structure of an unlicensed band reuse function of an apparatus, in accordance with an embodiment of the invention.

As illustrated in FIG. 4, the functionality of the UBRF is defined by two modules, for example a management module and a resizing module. The management module enables efficient scheduling of license-exempt protocol stacks to reserve available resources on a band or bands of an unlicensed spectrum for data transmission between two remote access terminals. According to an embodiment of the invention, the management module includes a service access point (SAP), for example RB_Manage_SAP. The RB_Manage_SAP receives a resource request from a D2D MAC/PHY stack or stacks (collectively referred hereinafter as a singular D2D MAC/PHY stack), whereby the resource request includes requirements for data transmission (e.g., a detected idle unlicensed channel index at each remote access terminal) between the remote access terminals. The resource request may also include at least one of a Buffer Status Report (BSR), Resource Size and a Quality of Service Class Identifier (QCI) 3GPP.

According to certain embodiments of the invention, the resource request may be autonomously triggered by signal detection at each remote access terminal, or probe signaling between the remote access terminals in communication with one another, for example using a D2D MAC/PHY stack. In other embodiments of the invention, the network node triggers the transmission and receipt of the resource request between the remote access terminals.

In response to receiving the resource request, the management module identifies available resources on the unlicensed spectrum that satisfy the requirements received in the resource request. The management module identifies the available resources by determining, for example an amount of resources to be acquired, the band or channel (or bands/channels) from which these available resources will be selected from within the unlicensed spectrum, and by what non-D2D MAC/PHY stack will these available resources be acquired. For example, the management module may send a request to the non-D2D MAC/PHY stack notifying the non-D2D MAC/PHY stack to send a Request to Send/Clear to Send (RTS/CTS) including, for example a longest network access vector (NAV), and report the result (i.e., a successful or unsuccessful retrieval of the RTS/CTS including the NAV) to the UBRF. In one example, the NAV may include 15 bits to denote the time duration in microseconds, the maximum length of the reserved available resources is 32.768 milliseconds and the length of the RTS and the CTS is tens of microseconds, assuming a 2 Mpbs bit rate, thus providing a RTS of 160/2000000=80 microseconds, and a CTS of 112/2000000=56 microseconds. These lengths may be sufficient for the WLAN remote access terminal to channel switch and send the RTS/CTS signal on multiple channels, thus allowing D2D remote access terminals to reuse multiple channels simultaneously. Once the available resources have been identified, the management module reserves these available resources for use by the D2D MAC/PHY stack. The RTS/CTS signaling may be implemented according to a 802.11 MAC/PHY protocol stack via the UBRF, as illustrated in FIG. 5.

Figure 5:
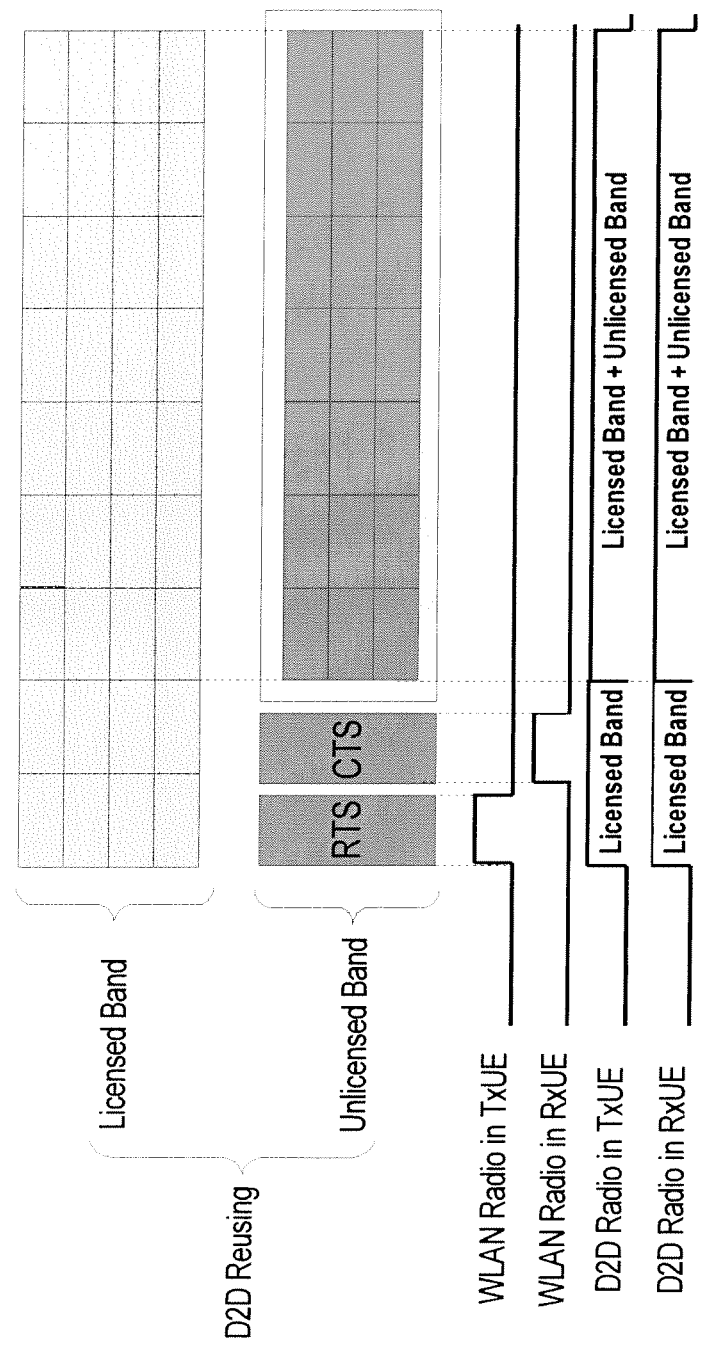
FIG. 5 illustrates D2D reuse of licensed and unlicensed bands between remote access terminals, in accordance with an embodiment of the invention.

FIG. 5 illustrates D2D reuse of licensed and unlicensed bands between remote access terminals, in accordance with an embodiment of the invention. As shown in FIG. 5, reuse of the unlicensed band or bands for D2D data transmission between two remote access terminals (e.g., the transmitting UE and the receiving UE) occurs after the RTS/CTS signaling, following D2D resource granularity, by employing the resizing module of the UBRF. The timing of the WLAN radio activation/deactivation is also shown in FIG. 5, which is controlled by the UBRF. In a 802.11 carrier sense multiple access with collision avoidance (CSMA/CA) protocol, a negative acknowledgement/acknowledgment (NACK/ACK) may also be included in the NAV time period. In certain embodiments of the invention, the NACK/ACK period is also reused in the D2D data transmission.

The RB_Manage_SAP then transmits information including a resource reservation result to the D2D MAC/PHY stack relating to the available resources of the selected unlicensed band or bands (i.e., the location of the selected resources available in the unlicensed band or bands, the guard band/interval parameters, and the duration of the reservation when reuse of the resources on the unlicensed band are available).

The resizing module of the UBRF can include one or more SAPs, for example RB_Collect_SAPx, where x=1, 2, 3, etc. The RB_Collect_SAPx controls the activation/deactivation of the x-th non-D2D MAC/PHY stack, and further sends the resource reservation result back to the management module, before the resource reservation result is sent to the D2D MAC/PHY stack. The resizing module of the UBRF is remote access terminal-specific and communicates with the single management module of the UBRF. As previously discussed, requirements for the data transmission between the remote access terminals are received in the resource request. According to an embodiment of the invention, these requirements include the resource granularity of different remote access terminals and the guard period, both in the time and frequency domains. Based on these requirements, the resizing module of the UBRF resizes the resources between the non-D2D MAC/PHY stack and the D2D MAC/PHY stack to reduce occurrences of interference or collision during data transmission between the remote access terminals. Once the resources have been resized by the UBRF, data transmission commences using the available resources on both the licensed and the unlicensed bands. This data transmission continues until the expiration of the resource reservation for use of the unlicensed band.

Figure 6:
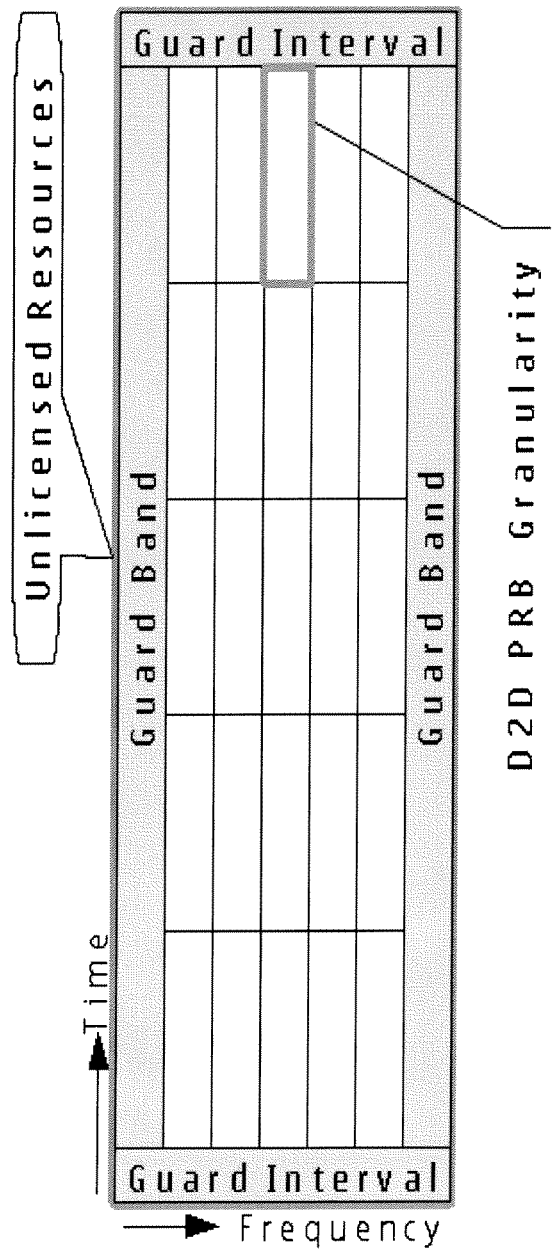
FIG. 6 illustrates resizing of unlicensed resources for D2D communication reuse, in accordance with an embodiment of the invention.

FIG. 6 illustrates an example of unlicensed resources resized for D2D communication reuse, in accordance with an embodiment of the invention. As shown in FIG. 6, in a 802.11a WLAN OFDM protocol, 52 subcarriers are employed with spacing of 312.5 kHz and a bandwidth of 20 MHz. The frame length is variable with FFT symbol length being 0.004 ms. In a 3GPP Revision 8 LTE system, one physical resource block includes 12 subcarriers with spacing at 15 kHz, and each subframe is 0.5 ms in a time domain. The WLAN in a DCF mode is an asynchronous transmission, whereas the LTE or LTE-A D2D transmission, according to certain embodiments of the invention, is a synchronous transmission via a central clock from the eNB. Therefore, taking into account the resource granularity of different remote access terminals and the guard period, both in the time and frequency domains, the resizing module of the UBRF resizes the resources between the non-D2D MAC/PHY stack and the D2D MAC/PHY stack to reduce occurrences of interference or collision during data transmission between the remote access terminals.

In accordance with certain embodiments of the invention, D2D data transmission uses resources from both the licensed and unlicensed bands, where the unlicensed resources were reserved by a previous RTS/CTS signaling. As a result, other license-exempt devices do not attempt to retrieve these resources. Upon expiration of the resource reservation, D2D data transmission continues over the licensed band or bands, while the data transmission over the unlicensed band or bands terminate. At this point, the other license-exempt devices are now free to compete for the available resources over these unlicensed band or bands.

In accordance with another embodiment of the invention, a LTE or LTE-A time division duplex (TDD) radio is provided to use unlicensed resources without the use of a band or channel reservation via, for example RTS/CTS by the non-D2D MAC/PHY protocol stack. In this case, the available resources on the unlicensed band are not reserved, but upon being identified are used by the D2D MAC/PHY protocol stack to perform D2D data transmission between the remote access terminals.

Figure 7:
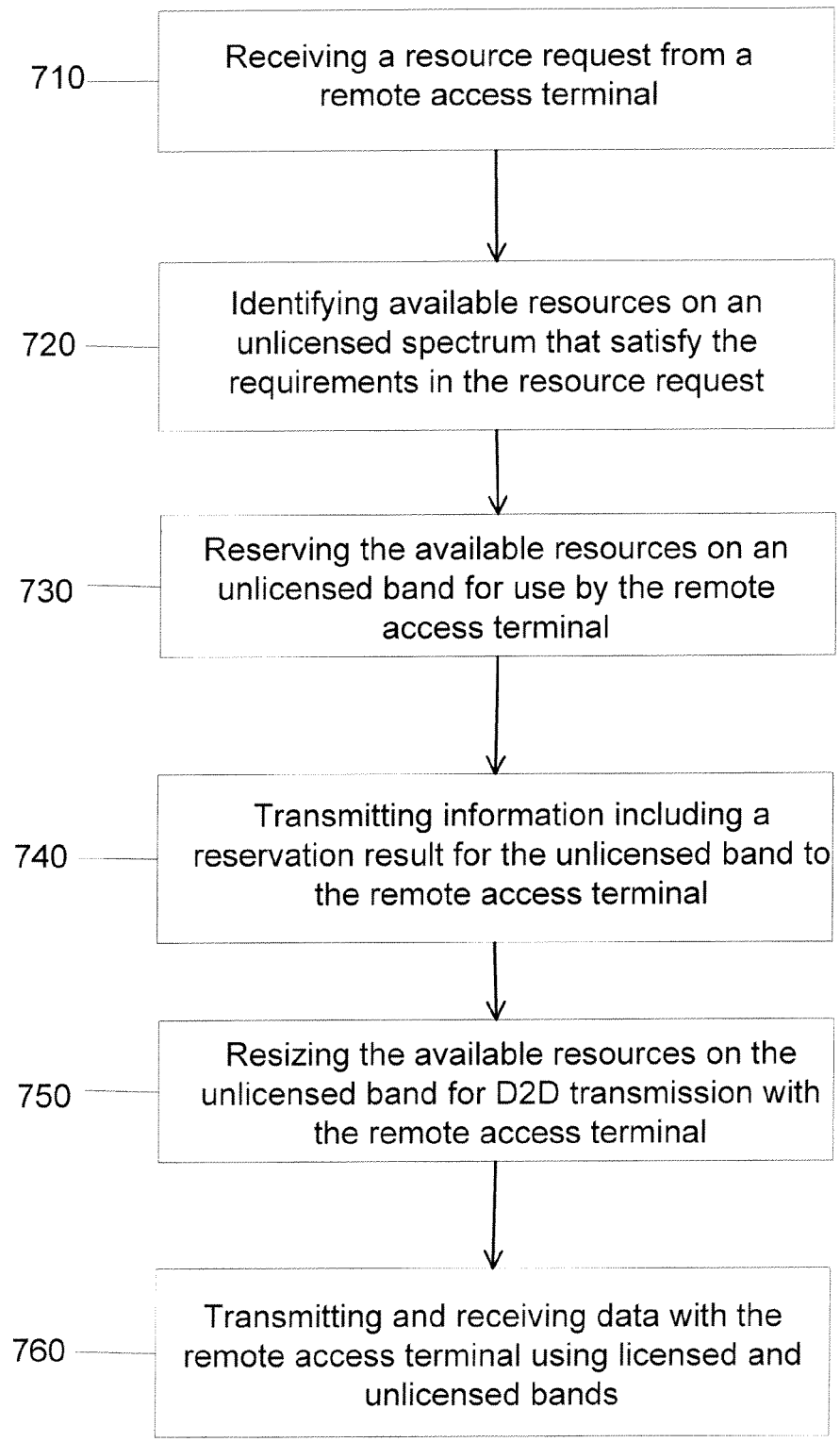
FIG. 7 illustrates a method, in accordance with an embodiment of the invention.

FIG. 7 illustrates a method, in accordance with an embodiment of the invention. The method includes receiving, at a first remote access terminal, a resource request from a second remote access terminal (step 710). Receiving the resource request includes receiving the resource request from a D2D MAC/PHY protocol stack of the second remote access terminal. At step 720, the method further includes identifying available resources on an unlicensed spectrum that satisfy the requirements received in the resource request. The step of identifying includes determining at least one of an amount of resources to be acquired, the band or channel (or bands/channels) from which these available resources will be selected from within the unlicensed spectrum, and by what non-D2D MAC/PHY stack will these available resources be acquired. Further, the method includes reserving the available resources for use by the D2D MAC/PHY protocol stack of the second remote access terminal (step 730). At step 740, the method includes transmitting information including a reservation result to the second remote access terminal relating to the available resources. The method further includes, at step 750, resizing the available resources that will be used for D2D data transmission with the second remote access terminal Step 760 of the method includes transmitting and receiving data with the second remote access terminal over available resources of a licensed band and the available resources identified for the unlicensed band, until the reservation of the available resources on the unlicensed band expires.

Figure 8:
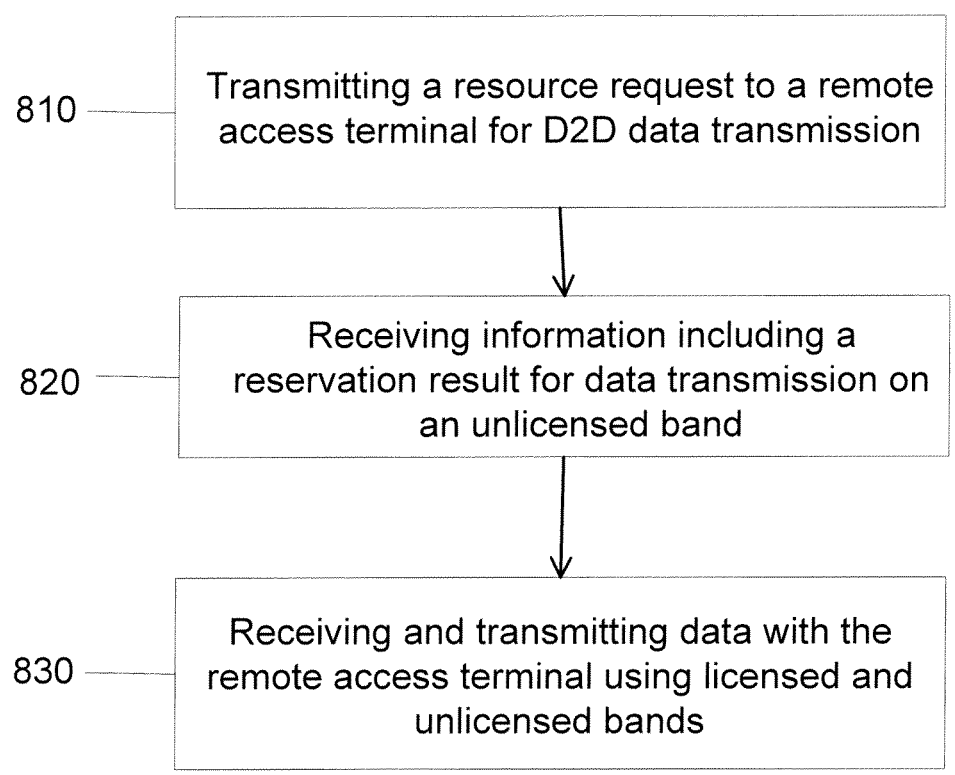
FIG. 8 illustrates another method, in accordance with an embodiment of the invention.

FIG. 8 illustrates another method, in accordance with an embodiment of the invention. The method includes transmitting, from a first remote access terminal, a resource request to a second remote access terminal. The step of transmitting includes transmitting the resource request from a D2D MAC/PHY protocol stack of the first remote access terminal (step 810). The method further includes receiving information from the second remote access terminal, whereby the information includes a reservation result relating to available resources on an unlicensed band for data transmission between the first and the second remote access terminals, based on the transmitted resource request (step 820). Step 830 of the method includes receiving and transmitting data with the second remote access terminal over available resources of a licensed band and the available resources reserved on the unlicensed band, until the reservation of the available resources on the unlicensed band expires.

Figure 9:
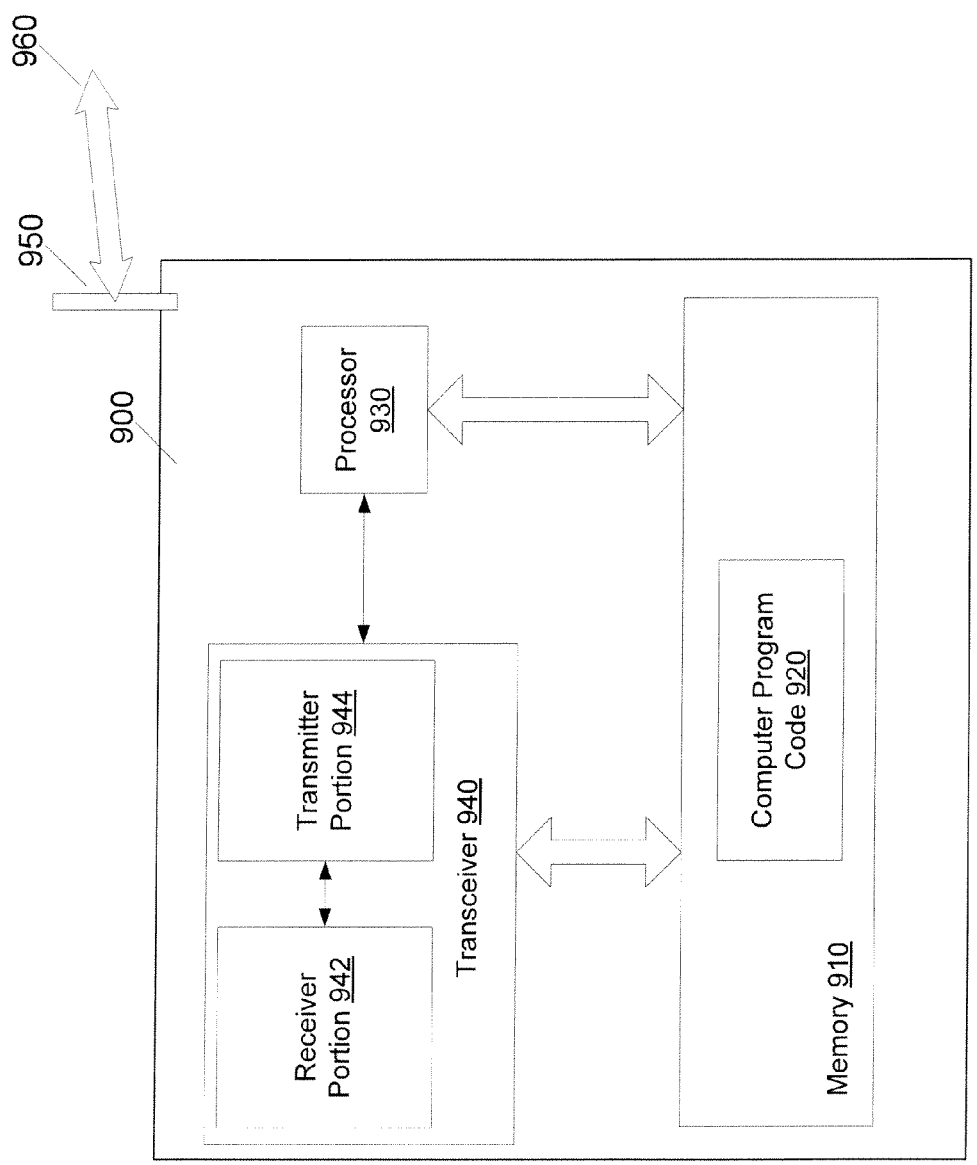
FIG. 9 illustrates an apparatus, in accordance with an embodiment of the invention.

FIG. 9 illustrates an apparatus, in accordance with an embodiment of the invention. The apparatus 900 may include a remote access terminal (e.g., a mobile node) or a network node (e.g., the eNB). The apparatus 900 may include a memory 910 including computer program code 920. The computer program code 920 may be embodied on a computer readable non-transitory medium. The apparatus 900 may also include a processor 930 for processing information and executing instructions or operations. The memory 910 may be coupled to the processor 930 for storing information and instructions to be executed by the processor 930. The computer program code 920 may be encoded with instructions to control the processor 930 to perform a process, such as the process illustrated in FIGS. 7 and 8.

While a single memory 910 and a single processor 930 are illustrated in FIG. 9, multiple memory and multiple processors may be utilized according to other embodiments.

Further, the apparatus 900 may be configured to communicate, using a transceiver 940 having a receiver portion 942 and a transmitter portion 944, with a remote access terminal or a network node (e.g., a base station, an evolved node B, or a high speed downlink packet access node (not illustrated)). The apparatus 900 may further include an antenna 950 to communicate with the remote access terminal or the network node over a wireless link 960, which may be an ad-hoc or a cellular radio link.

Figure 10:
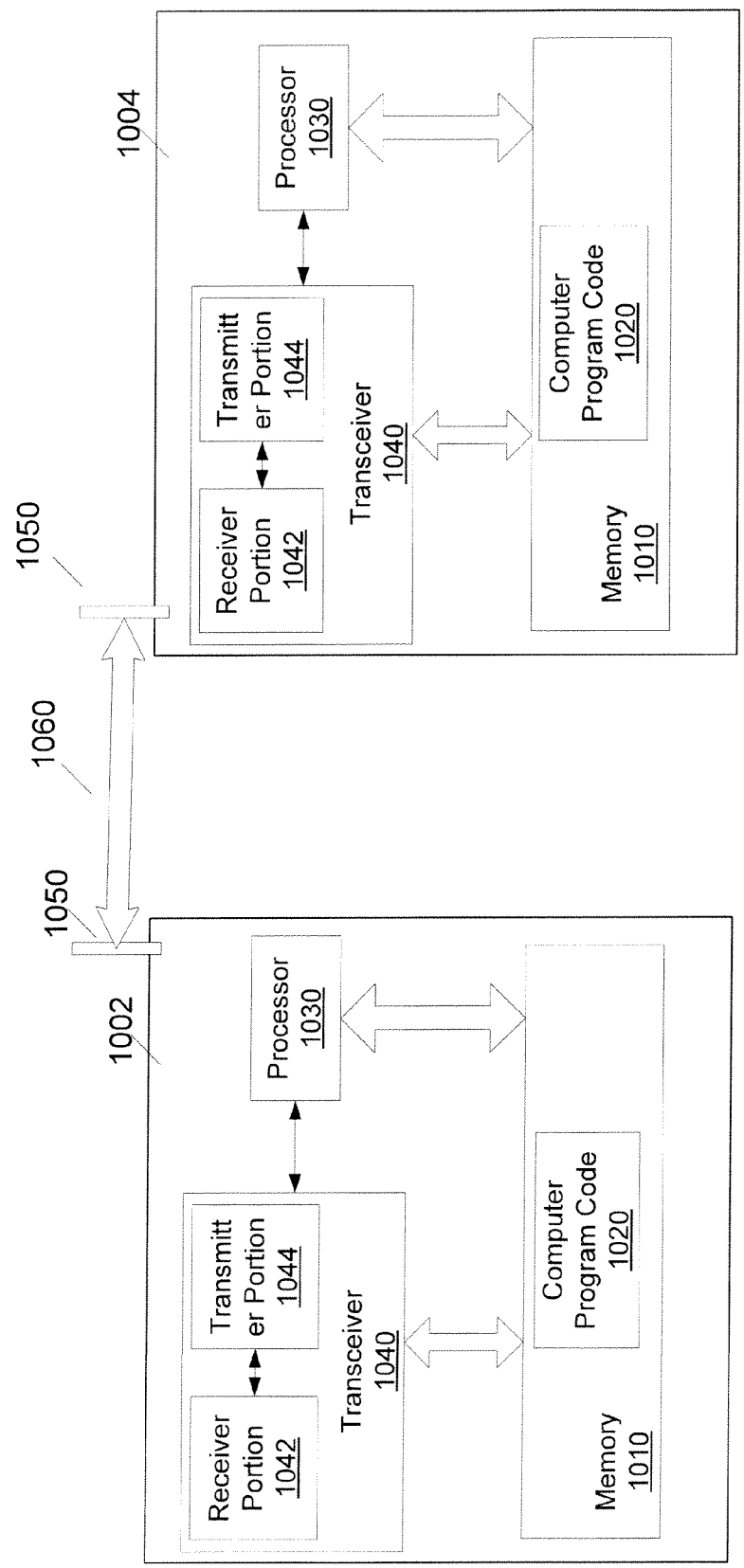
FIG. 10 illustrates a system, in accordance with an embodiment of the invention.

FIG. 10 illustrates a system, in accordance with an embodiment of the invention. The system 1000, as shown in FIG. 10, includes a first apparatus 1002 and a second apparatus 1004. The first and second apparatuses 1002, 1004 may include, for example a remote access terminal or UE that are equipped for D2D communication (data transfer) in a heterogeneous/hybrid communication network. The structure of each of the first apparatus 1002 and the second apparatus 1004 include the components discussed above for the apparatus shown in FIG. 9.

In view of the above, certain embodiments of the invention provide non-obvious advantages over conventional hybrid communication networks. For example, certain embodiments permit the dynamic reuse of an unlicensed band with the assistance of a WLAN air interface, for example when the WLAN is operating in a DCF mode. The WLAN air interface is utilized to reserve a channel and a D2D interface to transmit data with a HARQ mechanism. As a result, certain embodiments of the invention avoid the need to change the LTE MAC/PHY to support the unlicensed band reuse, as required in conventional hybrid communication networks. Backwards compatibility, low complexity and low power consumption via coordinated discontinuous transmission and reception (DTX/DRX) control may also be provided.

In accordance with certain embodiments of the invention, non-D2D communication protocol MAC/PHY stacks may be used for D2D reuse of resources on an unlicensed band. For example, a non-D2D MAC/PHY stack may be applied to acquire unlicensed resources, while the data is transmitted using a D2D radio interface.

In an alternative embodiment of the invention, a non-D2D MAC/PHY stack is provided for direct data transmission (i.e., a WLAN or Bluetooth). The difference between a 3GPP-type D2D MAC/PHY and a non-D2D MAC/PHY stack (i.e., 802.11 series where the resource timing is asynchronous and no HARQ is employed in lower layers) would cause high complexity to high layer scheduling to satisfy quality of service (QoS) requirements.

In another embodiment of the invention, the UBRF can easily be extended to new, non-D2D MAC/PHY stacks to enable an autonomous reuse of unlicensed resources for D2D communication, where no inter-networking signaling support is needed. As a result, this mechanism can be easily implemented in a licensed-based communication network.

Further to the discussion above, it is to be understood that in an embodiment of the invention, the steps and the like may be changed without departing from the spirit and scope of the present invention. In addition, the methods described in FIGS. 7 and 8 may be repeated numerous times.

It should be noted that many of the functional features described in this specification have been presented as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

The memory 910, 1010 may be of any type suitable to the local technical environment and may be implemented using any suitable data storage technology, machine or computer readable storage medium, such as semiconductor-based memory devices, flash memory, magnetic memory devices and systems, optical memory devices and systems, fixed memory and removable memory, as non-limiting examples. The processor 930 may be of any type suitable to the local technical environment, and may include one or more of general purpose computers, special purpose computers, microprocessors, digital signal processors (DSPs), and processors based on multi-core processor architecture, as non-limiting examples.

A computer program code 920, 1020 according to certain embodiments of the invention, may be composed of modules that are in operative communication with one another, and which are designed to pass information or instructions to a communication device, such as the mobile node or the user equipment, a personal computer, a handheld device, such as a mobile, a cellular telephone, or a personal digital assistant (PDA) having wireless communication capabilities, a portable computer having wireless communication capabilities, an image capture device, such as a digital camera having wireless communication capabilities, a gaming device having wireless communication capabilities, a music storage and playback appliance having wireless communication capabilities, an Internet appliance permitting wireless Internet access and browsing, as well as a portable unit or a terminal that incorporates combinations of such functions.

The computer program code 920, 1020 may be configured to operate on a general purpose computer or an application specific integrated circuit (ASIC).

The computer readable non-transitory medium may include any media or means that can contain, store, communicate, propagate or transport the instructions for use by or in connection with an instruction execution system, apparatus, or device, for example, a disk media, computer memory, or other storage device. Non-transitory storage medium does not include a transitory signal. Examples of non-transitory storage medium include, for example, a computer-readable medium, a computer distribution medium, a computer-readable storage medium, and a computer program product.

The embodiments of the invention discussed above may be implemented by hardware, computer software executable by the processor 930 of the apparatus 900, the processor 1030 of the apparatus 1002 or the apparatus 1004, or by a combination of hardware and software.

The software and/or hardware may reside on apparatus 900, apparatus 1002, apparatus 1004, or other mobile communication devices. If desired, part of the software and/or hardware may reside on the apparatus 900, and part of the software and/or hardware may reside on other mobile communication devices. Similarly, part of the software and/or hardware may reside on the apparatus 1002, part on the apparatus 1004, and part may reside on other mobile communication devices. In an embodiment of the invention, software, or an instruction set may be maintained on any one of various conventional computer-readable media.

In accordance with an embodiment of the invention, there is provided a computer program product embodied on a computer readable storage medium. The computer program product is encoded with instructions to control a processor to perform a process, which includes receiving, at a first terminal, a request for resources from a second terminal, and identifying, at the first terminal, available resources on an unlicensed band based on the request. The process further includes reserving, at the first terminal, the identified available resources for use by the second terminal, and transmitting, at the first terminal, a reservation response to the second terminal The reservation response includes information relating to the reserved available resources. Further, the process includes transmitting, at the first terminal, data to the second terminal over a licensed band and the available resources reserved on the unlicensed band.

In accordance with an embodiment of the invention, there is provided a computer program product embodied on a computer readable storage medium. The computer program product is encoded with instructions to control a processor to perform a process, which includes transmitting, at a first terminal, a request for resources to a second terminal, and receiving information from the second terminal. The information includes a reservation result relating to available resources reserved on an unlicensed band for data transmission between the first and the second terminals, based on the transmitted request. The process further includes receiving data from the second terminal over a licensed band and the available resources reserved on the unlicensed band.

One having ordinary skill in the art will readily understand that the invention as discussed above may be practiced with steps in a different order, and/or with hardware elements in configurations which are different than those which are disclosed. Therefore, although the invention has been described based upon these preferred and non-limiting embodiments, it would be apparent to those of skill in the art that certain modifications, variations, and alternative constructions would be apparent, while remaining in the spirit and scope of the invention. Thus, the example embodiments do not limit the invention to the particular listed devices and technologies. In order to determine the metes and bounds of the invention, therefore, reference should be made to the appended claims.

We claim:

1. A method, comprising:
    receiving, at a first terminal, a request for resources from a second terminal;
    identifying, at the first terminal, available resources on an unlicensed band based on the request;
    reserving, at the first terminal, the identified available resources for use by the second terminal;
    transmitting, at the first terminal, a reservation response to the second terminal, wherein the reservation response comprises information relating to the reserved available resources; and
    transmitting, at the first terminal, data to the second terminal over a licensed band and over the unlicensed band using the available resources reserved on the unlicensed band.

2. The method of claim 1, wherein the receiving comprises receiving the request from a device-to-device protocol stack of the second terminal.

3. The method of claim 1, wherein the receiving comprises receiving the request comprising one of a buffer status report, a resource size and a quality of service class identifier for data transmission between the first terminal and the second terminal.

4. The method of claim 1, wherein the receiving comprises receiving the request based on one of a signal detection at the first terminal and the second terminal, probe signaling between the first terminal and the second terminal, and a signal from a network node.

5. The method of claim 1, wherein the identifying comprises determining one of an amount of resources to be acquired, the unlicensed band from which the available resources will be selected, and a non-device-to-device protocol stack of the first terminal from which the available resources will be acquired.

6. The method of claim 1, wherein the transmitting the reservation response comprises transmitting data regarding one of a location of the reserved available resources in the unlicensed band, a guard band/interval parameter, and an amount of time that the reserved available responses on the unlicensed band will be available for data transmission.

7. The method of claim 1, further comprising:
    resizing the available resources identified on the unlicensed band prior to transmitting data to the second terminal.

8. The method of claim 7, wherein the resizing comprises resizing the available resources identified on the unlicensed band based on one of resource granularity of the first terminal or the second terminal and a time period.

9. The method of claim 1, wherein the transmitting the data to the second terminal comprises transmitting over the licensed band and the unlicensed band until a time period of the available resources reserved on the unlicensed band expires.

10. An apparatus, comprising:
    at least one memory including computer program code; and
    at least one processor,
    wherein the at least one memory and the computer program code are configured to, with the at least one processor, cause the apparatus at least to
    receive a request for resources from a terminal,
    identify available resources on an unlicensed band based on the request,
    reserve the identified available resources for use by the terminal,
    transmit a reservation response to the terminal, wherein the reservation response comprises information relating to the reserved available resources; and
    transmit data to the terminal over a licensed band and over the unlicensed band using the available resources reserved on the unlicensed band.

11. The apparatus of claim 10, wherein the at least one memory and the computer program code are further configured to, with the at least one processor, cause the apparatus at least to receive the request from a device-to-device protocol stack of the terminal.

12. The apparatus of claim 10, wherein the at least one memory and the computer program code are further configured to, with the at least one processor, cause the apparatus at least to determine one of an amount of resources to be acquired, the unlicensed band from which the available resources will be selected, and a non-device-to-device protocol stack of the first terminal from which the available resources will be acquired.

13. The apparatus of claim 10, wherein the at least one memory and the computer program code are further configured to, with the at least one processor, cause the apparatus at least to transmit data regarding one of a location of the reserved available resources in the unlicensed band, a guard band/interval parameter, and an amount of time that the reserved available responses on the unlicensed band will be available for data transmission.

14. The apparatus of claim 10, wherein the at least one memory and the computer program code are further configured to, with the at least one processor, cause the apparatus at least to resize the available resources identified on the unlicensed band prior to transmitting data to the terminal.

15. The apparatus of claim 14, wherein the at least one memory and the computer program code are further configured to, with the at least one processor, cause the apparatus at least to resize the available resources identified on the unlicensed band based on one of resource granularity of the first terminal or the second terminal and a time period.

16. The apparatus of claim 10, wherein the at least one memory and the computer program code are further configured to, with the at least one processor, cause the apparatus at least to transmit the data to the terminal over the licensed band and the unlicensed band until a time period of the available resources reserved on the unlicensed band expires.

17. A method, comprising:
    transmitting, at a first terminal, a request for resources to a second terminal;
    receiving information from the second terminal, wherein the information comprises a reservation result relating to available resources reserved on an unlicensed band for data transmission between the first and the second terminals, based on the transmitted request; and
    receiving data from the second terminal over a licensed band and over the unlicensed band using the available resources reserved on the unlicensed band.

18. The method of claim 17, wherein the receiving comprises receiving the data until a time period of the available resources reserved on the unlicensed band expires.

19. An apparatus, comprising:
at least one memory including computer program code; and
at least one processor,
wherein the at least one memory and the computer program code are configured to, with the at least one processor, cause the apparatus at least to
transmit a request for resources to a terminal;
receive information from the terminal, wherein the information comprises a reservation result relating to available resources on an unlicensed band for data transmission from the terminal, based on the transmitted request; and
receive data from the terminal over a licensed band and over the unlicensed band using the available resources reserved on the unlicensed band.

20. The apparatus of claim 19, wherein the at least one memory and the computer program code are further configured to, with the at least one processor, cause the apparatus at least to receive the data until a time period of the available resources reserved on the unlicensed band expires.

* * * * *